United States Patent [19]
Sagisaka et al.

[11] Patent Number: 5,701,866
[45] Date of Patent: Dec. 30, 1997

[54] MALFUNCTION DIAGNOSIS DEVICE FOR ENGINE SPEED CONTROLLER

[75] Inventors: Yasuo Sagisaka, Komaki; Yoshihiko Hirata, Kariya, both of Japan

[73] Assignee: Denso Corporation, Kariya, Japan

[21] Appl. No.: 771,291

[22] Filed: Dec. 20, 1996

[30] Foreign Application Priority Data

Dec. 22, 1995 [JP] Japan .................. 7-335078

[51] Int. Cl.⁶ .................................. F02D 39/02
[52] U.S. Cl. .................................. 123/339.15
[58] Field of Search .............. 123/339.15, 585, 123/198 D, 339.14; 73/118.1

[56] References Cited

U.S. PATENT DOCUMENTS

| | | | |
|---|---|---|---|
| 4,873,954 | 10/1989 | Codling | 123/339.15 |
| 4,960,087 | 10/1990 | Junginger et al. | 123/198 D |
| 5,031,595 | 7/1991 | Heck et al. | 123/339.15 |
| 5,513,610 | 5/1996 | Okamoto et al. | 123/339.15 |
| 5,622,151 | 4/1997 | Lang | 123/339.15 |

*Primary Examiner*—Raymond A. Nelli
*Attorney, Agent, or Firm*—Nixon & Vanderhye P.C.

[57] ABSTRACT

To appropriately detect malfunction of an air quantity adjusting valve in any type of case, an electronic control type throttle valve is disposed in an air intake pipe of an engine. An ISC valve which is duty controlled by an ECU is disposed in a bypass passage which bypasses the throttle valve. A CPU within the ECU establishes a drive duty ratio of the ISC valve to control engine speed in a target speed region during idling of the engine. Additionally, in a case where the drive duty ratio exceeds a predetermined control range (0 to 100%), the CPU controls idle speed by the throttle valve. Accordingly, in a case where throttle aperture is larger than a predetermined value TAH, or in a case where throttle aperture is smaller than a predetermined value TAL (where TAH>TAL), the CPU determines that an opening side malfunction or a closing side malfunction has occurred in the ISC valve.

19 Claims, 7 Drawing Sheets

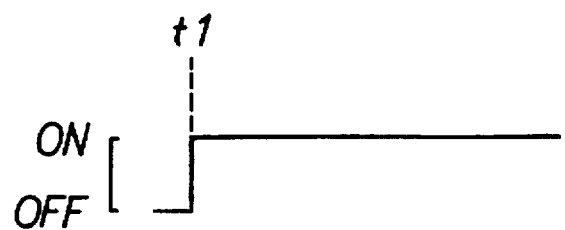
FIG. 4A  IDLE
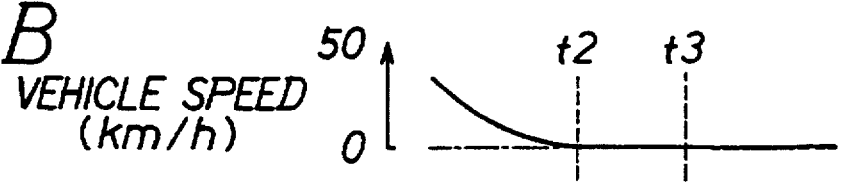
FIG. 4B  VEHICLE SPEED (km/h)
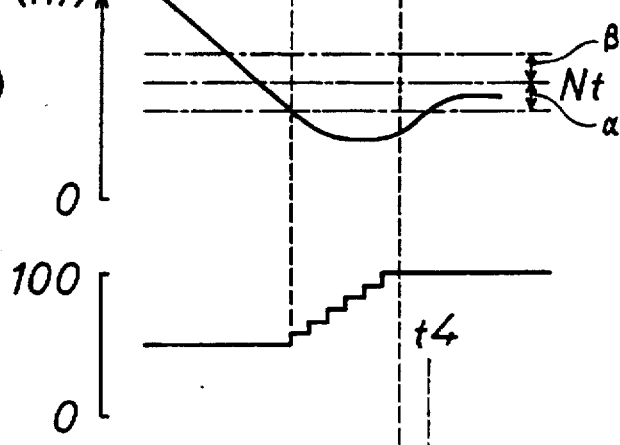
FIG. 4C  Ne(rpm)
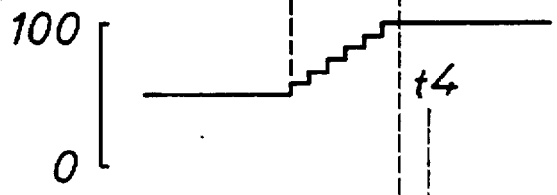
FIG. 4D  DISC(%)
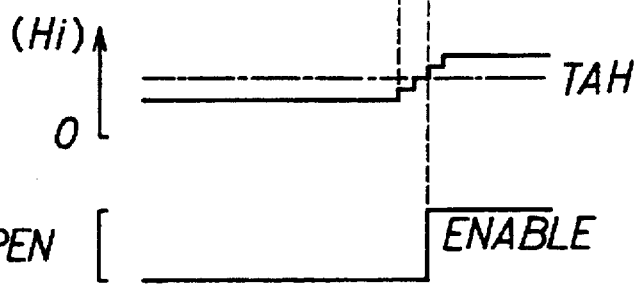
FIG. 4E  TA(°)
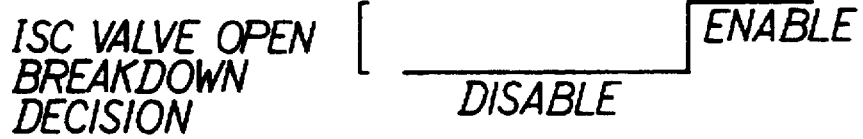
FIG. 4F  ISC VALVE OPEN BREAKDOWN DECISION FIG. 5A  IDLE  ON/OFF  — t11

FIG. 5B  VEHICLE SPEED (km/h)  50 / 0  — t12, t13

FIG. 5C  Ne (rpm)  (Hi) / 0  — β, Nt, α

FIG. 5D  DISC (%)  100 / 0  — t14

FIG. 5E  TA (°)  (Hi) / 0  — TAL

FIG. 5F  ISC VALVE OPEN BREAKDOWN DECISION  DISABLE | ENABLE

MALFUNCTION DIAGNOSIS DEVICE FOR ENGINE SPEED CONTROLLER

CROSS-REFERENCE TO RELATED APPLICATION

The present application is related to and claims priority from Japanese Patent Application No. Hei 7-335078, incorporated herein by reference.

BACKGROUND OF THE INVENTION

1. Field of the Invention

This invention relates to a malfunction diagnosis device for an engine speed controller.

2. Description of Related Art

A failsafe method of an internal combustion engine of, for example, Japanese Patent Application Laid-Open No. Hei 3-267542 has been disclosed as art of this type. An ISC valve (idle speed control valve) for opening and closing a bypass passage of an air intake pipe is provided in an engine control system according to this document, and engine speed during engine idle is regulated by operation of this ISC valve. Additionally, a throttle opening sensor for detecting an aperture of a throttle valve and an accelerator opening sensor for detecting an amount of operation of an accelerator pedal are provided, and a valve open immobile state of the throttle valve is detected from outputs of these sensors. Accordingly, in a case wherein a valve open immobile state of the throttle valve has been detected, valve opening control of the ISC valve provided in the bypass passage of the air intake passage is performed so that, because of this, a quantity of air required for vehicle travel is supplied to the engine.

However, according to the above-described prior art, malfunction detection cannot be performed, for example, during engine idling. That is to say, using prior art techniques, it is difficult to discriminate whether the ISC valve is operating normally in a state where there is no depression of the accelerator pedal.

SUMMARY OF THE INVENTION

In light of the foregoing problem, it is an object of the present invention to provide a malfunction diagnosis device for an engine speed controller which can appropriately detect malfunction of an air quantity adjusting valve in a wide range of situations.

To attain the foregoing object, according to a first aspect of the present invention, a first air quantity controlling device causes a first air quantity adjusting valve to be driven in a predetermined control region so that a target engine speed is obtained. A second air quantity controlling device causes a second air quantity adjusting valve to be driven in continuation of the first air quantity adjusting valve in a case wherein a control quantity of the first air quantity adjusting valve due to the first air quantity controlling device has deviated from the control region. Accordingly, a malfunction diagnosing unit determines a control quantity of the second air quantity adjusting valve due to the second air quantity controlling device and, when the control quantity is not in a predetermined region, infers that malfunction has occurred on the first air quantity adjusting valve side.

Preferably, the malfunction diagnosing unit diagnoses a malfunction wherein the first air quantity adjusting valve does not function on an opening side (opening side malfunction) at a time when an aperture of the second air quantity adjusting valve controlled by the second air quantity controlling device is a predetermined value or more, and along with this, diagnoses malfunction wherein the first air quantity adjusting valve does not function on a closing side (closing side malfunction) at a time when an aperture of the second air quantity adjusting valve controlled by the second air quantity controlling device is a predetermined value or less. Preferably, one of the first and second air quantity adjusting valves is a throttle valve, and the other is an idle speed control valve for opening and closing a bypass passage of an air intake passage.

Namely, the amount of intake air for the engine (engine speed) is controlled by drive of the first or second air quantity adjusting valve. In this case, when a target engine speed is not obtained by drive of the first air quantity adjusting valve, engine speed is controlled to the target valve by drive of the second air quantity adjusting valve. In a system to control idle speed to a target value wherein, for example, the first air quantity adjusting valve is an ISC valve and the second air quantity adjusting valve is a throttle valve, after an abnormality has occurred in this ISC Valve, air quantity is controlled by the throttle valve. Accordingly, when the control quantity of the throttle valve during idle exceeds a predetermined quantity, the ISC valve is determined to have malfunctioned.

In such a case, desired idle speed control can be continued despite malfunction of the ISC valve. At this time, malfunction of the ISC valve can reliably be determined. Additionally, unlike the prior art, malfunction diagnosis can be performed regardless of the aperture of the accelerator, and so malfunction diagnosis becomes possible even when in a state of no operation of the accelerator (i.e., an idle state).

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 4A–4F and 5A–5F are graphs showing malfunction diagnosis waveforms;

DETAILED DESCRIPTION OF THE PRESENTLY PREFERRED EXEMPLARY EMBODIMENTS (First Embodiment)

A first preferred embodiment of the present invention will be described hereinafter with reference to the drawings. This device is implemented as an electronic control system for controlling various actuators utilizing an electronic control unit (hereinafter termed "ECU"), and in particular relates to a device for suitably controlling engine idle speed by regulating an aperture of a throttle valve and an ISC valve provided in an engine air intake system.

Figure 1:
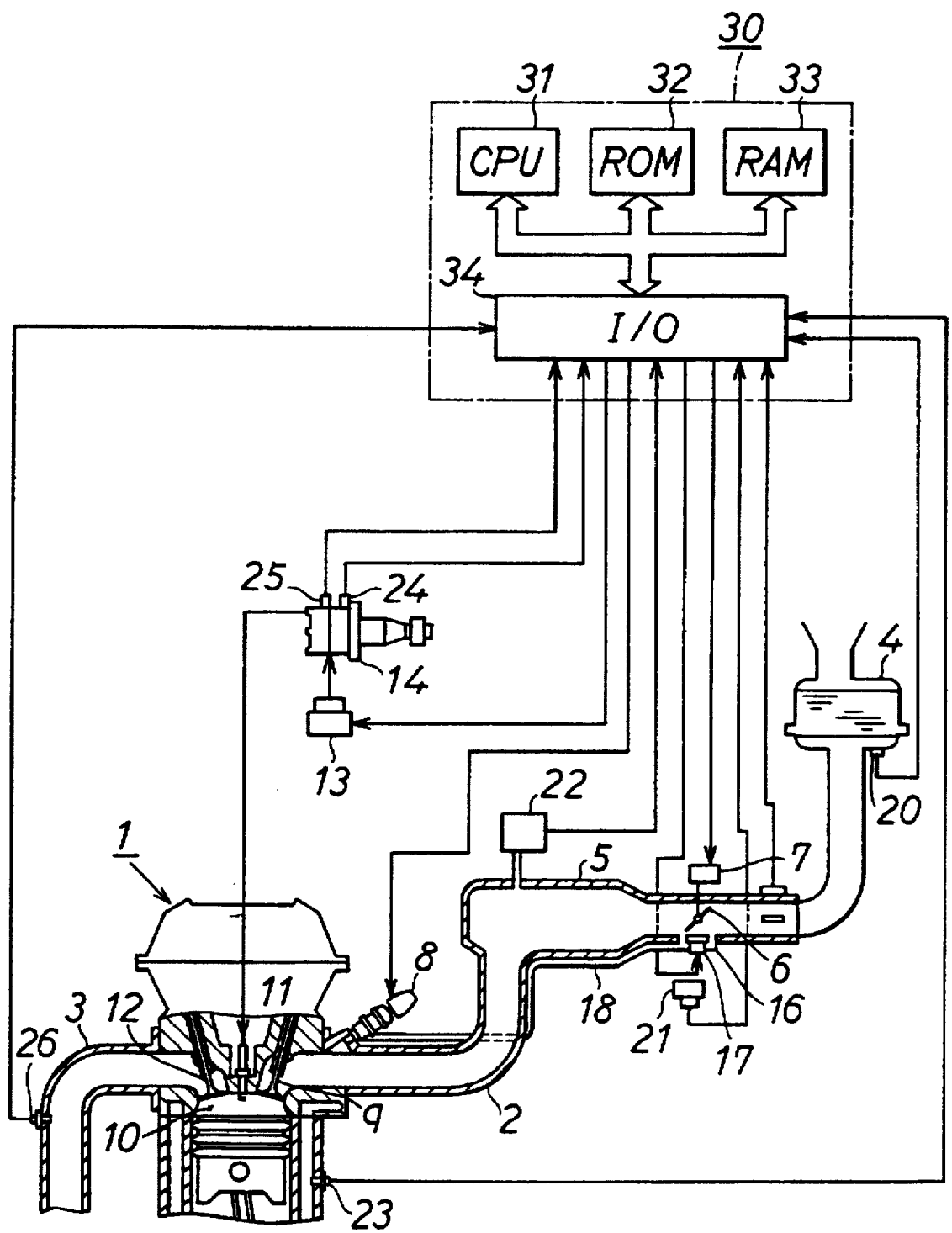
FIG. 1 is a structural view of a control system according to a first preferred embodiment of the present invention.

FIG. 1 is a structural view indicating a schematic of this control system. In FIG. 1, an air intake pipe 2 and an exhaust pipe 3 are directly connected to a four cylinder spark ignition type gasoline engine (hereinafter termed simply "engine") 1. An air cleaner 4 is disposed in the uppermost flow portion of the air intake pipe 2, and air from this air cleaner 4 is taken into the air intake pipe 2. A surge tank 5 is provided in an intermediate portion of the air intake pipe 2. An electronically controlled throttle valve 6 is disposed on an upstream side of the surge tank 5, and an aperture of the throttle valve 6 is regulated by a step motor 7 (alternatively, a torque motor may be used). Drive of the step motor 7 is controlled by an ECU 30 which will be described later in accordance with a degree of depression of an accelerator pedal (not shown).

Fuel injection valves 8 are respectively disposed in the air intake pipes (intake ports) 2 of each of the several cylinders in the engine 1, and fuel pressure regulated to a predetermined constant pressure is supplied from a fuel tank (not shown) to the respective fuel injection valves 8. When fuel is sprayed into the air intake pipes 2 by opening of the fuel injection valves 8, the injected fuel and intake air form an air-fuel mixture, which is supplied via an air intake valve 9 to combustion chambers 10 in each of the several cylinders in the engine 1.

Additionally, spark plugs 11 are disposed respectively in the combustion chambers 10 of each of the several cylinders in the engine, and exhaust gas accompanying combustion by sparking of the spark plugs 11 passes via an exhaust valve 12 to an exhaust pipe 3 and a catalyst (not shown) and is discharged to the atmosphere. Herein, an igniter 134 generates high voltage from battery voltage, and the high voltage generated by this igniter 13 is distributed by a distributor 14 to the spark plugs 11 of each of the several cylinders.

A bypass passage 16 is provided to bypass the foregoing throttle valve 6, and an ISC valve 17, the aperture of which is duty-controlled by the ECU 30 which will be described later, is disposed in this bypass passage 16. Engine speed during idling is controlled to a target value by regulation of the aperture of this ISC valve 17. Additionally, a communicating passage 18 is connected to the bypass passage 16, and bypass air, the volume of which is regulated by the ISC valve 17 via this communicating passage 18, is supplied to the fuel injection valves 8. That is to say, according to the first embodiment, the fuel injection valve 8 is made up of a so-called air assist injector, and the fuel injection valve 8 is such that fuel is atomized by the influx of air due to the foregoing communicating passage 18.

An intake air temperature sensor 20 is provided in the uppermost flow portion of the air intake pipe 2, and intake air temperature is detected by the sensor 20. Additionally, a throttle opening sensor 21 is provided proximate to the disposed location of the throttle valve 6 of the air intake pipe 2, and the aperture of the throttle valve 6 (throttle aperture) is detected by this throttle opening sensor 21. Furthermore, an intake pipe internal pressure sensor 22 is provided in the surge tank 5 and internal pressure of the air intake pipe within the surge tank 5 is detected by this sensor.

A water temperature sensor 23 for detecting temperature of engine coolant water is provided in the engine 1. Additionally, a cylinder discriminating sensor 24 and a crank angle sensor 25 are disposed within the distributor 16. The crank angle sensor 25 generates a crank angle signal at each predetermined crank angle (for example, at every 30° CA) accompanying rotation of the crankshaft or camshaft of the engine 1. The cylinder discriminating sensor 24 generates a cylinder discrimination signal at each particular location of a particular cylinder (for example, each compression TDC of the first cylinder) accompanying rotation of the crankshaft or camshaft of the engine 1. Moreover, an oxygen concentration sensor 26 is provided in the exhaust pipe 3 of the engine 1, and concentration of oxygen in exhaust gas of the engine 1 is detected by this oxygen concentration sensor 26.

The ECU 30 is made up primarily of a computer composed of a known CPU 31, ROM 32, RAM 33, I/O port (input/output port) 34, and the like. The above-described intake air temperature sensor 20, throttle opening sensor 21, intake pipe internal pressure sensor 22, water temperature sensor 23, cylinder discriminating sensor 24, crank angle sensor 25, and oxygen concentration sensor 26 are connected to the ECU 30, and the ECU 30 inputs signals from these sensors and detects intake air temperature, throttle aperture, intake pipe internal pressure, engine water temperature, engine speed, oxygen concentration, and the like.

According to the present embodiment, a first air quantity adjusting valve is implemented by the ISC valve 17, and a second air quantity adjusting valve is implemented by the throttle valve 6. Additionally, the first air quantity controlling device, the second air quantity controlling device, and the malfunction diagnosing unit are implemented by the CPU 31 within the ECU 30.

A mode of operation of the first embodiment will be described next with reference to FIG. 2–4F.

Figure 2:
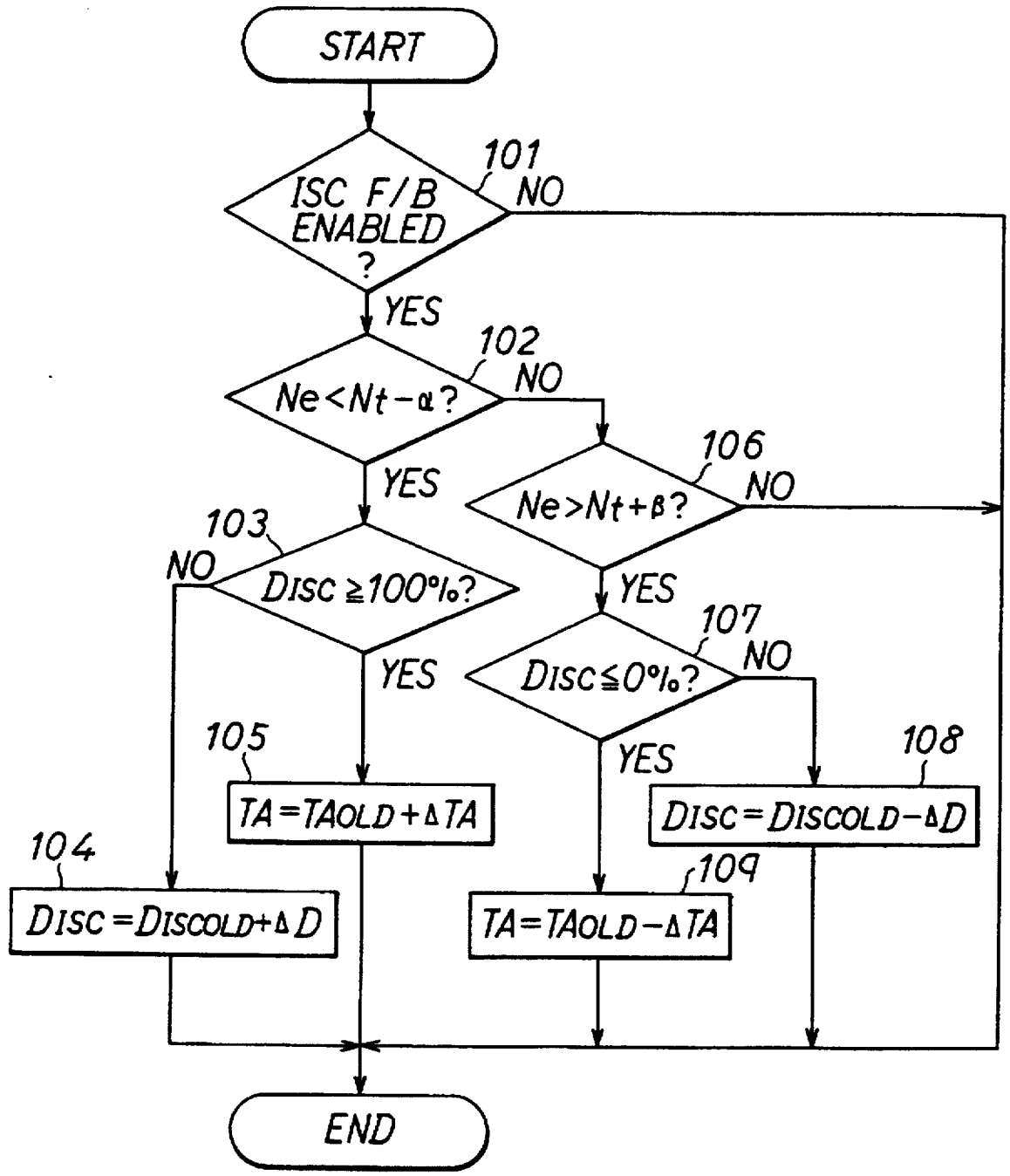
FIG. 2 is a flowchart of an idle speed control routine according to a first mode of embodiment.
Figure 3:
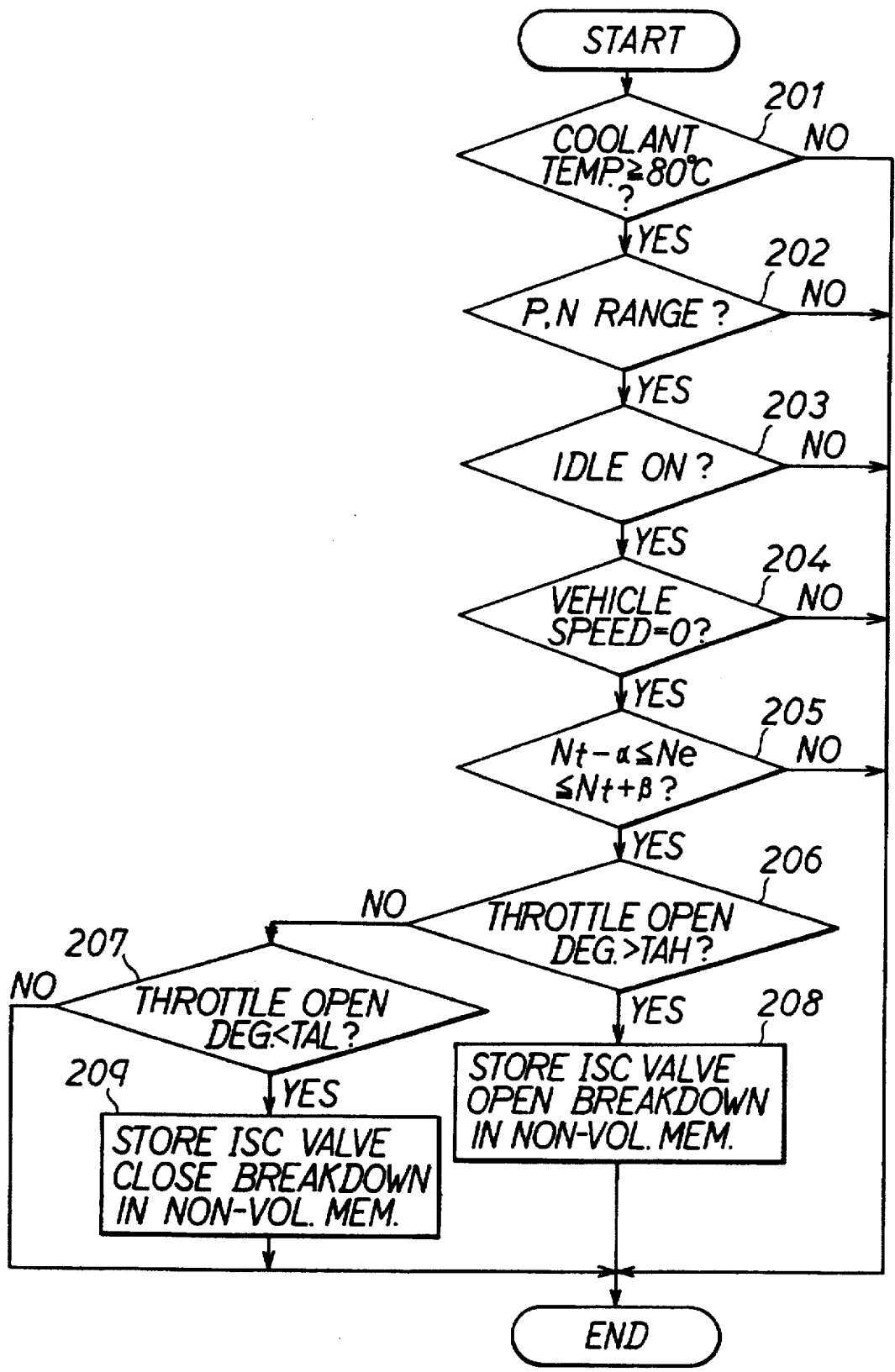
FIG. 3 is a flowchart of a malfunction diagnosis routine according to the first embodiment.

The flowchart of FIG. 2 shows an idle speed control routine according to the first embodiment. This routine controls idle speed of the engine 1 by regulating an aperture of the throttle valve 6 and the ISC valve 17. The flowchart of FIG. 3 shows a malfunction diagnosis routine for the ISC valve 17. A characteristic mode of operation according to this embodiment will be described hereinafter with reference to the foregoing flowcharts.

The routine of FIG. 2 is executed in a predetermined cycle (for example, an 8 ms cycle), and the CPU 31 firstly determines in Step 101 whether ISC feedback conditions (i.e., feedback conditions for idle speed control) have been satisfied. Herein, the ISC feedback conditions include, for example, engine water temperature being 80° C. or more, an idle switch being on, vehicle speed being equal to 0 km/h, and the like. "Idle switch being on" refers to when, for example, an amount of depression of the accelerator pedal is substantially "0" or when a required throttle aperture determined by the accelerator pedal is in a vicinity of fully open. In a case wherein the ISC feedback conditions are not fulfilled, the CPU 31 terminates the routine without further action.

In a case wherein the ISC feedback conditions are fulfilled, the CPU 31 controls engine speed Ne during idle within a range of "−α" to "+β" with respect to target idle speed Nt (for example, Nt=850 rpm, α=50 rpm, and β=50 rpm), as will be described hereinafter. Hereinafter, the control range for this target idle speed Nt is termed the target speed region. In such a case, initially the ISC valve 17 is controlled within a range wherein drive duty ratio $D_{ISC}$=0 to 100%. At this time, the throttle valve 6 is fixed at a predetermined idle position. In contrast to this, when the drive duty ratio $D_{ISC}$ reaches 0% or less or 100% or more, the aperture of the throttle valve 6 (throttle aperture TA) is increased or decreased, and the engine speed Ne is controlled in the above-described target speed region in accordance with the amount of increase or decrease thereof.

To go into greater detail, in Step 102 the CPU 31 determines whether engine speed Ne is smaller than a target speed region lower limit speed (=Nt−α). In a case where Ne <Nt −α, in Steps 103–105 the CPU 31 increases the aperture of the ISC valve 17 or the throttle valve 6 to increase the engine speed Ne. That is to say, in Step 103 the CPU 31 determines whether the drive duty ratio $D_{ISC}$ of the ISC valve 17 is 100% or more. Initially, a negative determination is made in Step 103, and the CPU 31 advances to Step 104. In Step 104 the CPU 31 adds a predetermined value ΔD (for example, 0.2%) to the previous drive duty ratio $D_{ISCOLD}$, determining a new drive duty ratio $D_{ISC}$ ($D_{ISC}=D_{ISCOLD}+$ ΔD), and terminates this routine.

The drive duty ratio $D_{ISC}$ continues to be added and when the drive duty ratio $D_{ISC}$ reaches 100%, an affirmative determination is made in step 103, and the CPU 31 advances step 105. In step 105 the CPU 31 adds a predetermined value ΔTA (for example, 0.1 deg) to the previous throttle aperture $TA_{OLD}$, determining a new throttle aperture TA (TA= $TA_{OLD}+$ΔTA), and terminates this routine.

Meanwhile, in a case wherein a negative determination is made in the foregoing Step 102, (i.e., in a case wherein Ne ≧Nt−α), in Step 106 the CPU 31 determines whether engine speed Ne is larger than a target speed region upper limit speed (=Nt+β). In a case where Ne>Nt+β, in Steps 107–109 the CPU 31 decreases the aperture of the ISC valve 17 or the throttle valve 6 to lower the engine speed Ne. That is to say, in Step 107 the CPU 31 determines whether the drive duty ratio $D_{ISC}$ of the ISC valve 17 is 0% or less. Initially, a negative determination is made in Step 107, and the CPU 31 advances to Step 108. In Step 108, the CPU 31 subtracts the predetermined value ΔD from the previous drive duty ratio $D_{ISCOLD}$, determining a new drive duty ratio $D_{ISC}$ ($D_{ISC}=$ $D_{ISCOLD}-$ΔD), and thereafter terminates this routine.

The drive duty ratio $D_{ISC}$ continues to be subtracted and when the drive duty ratio $D_{ISC}$ reaches 0%, an affirmative determination is made in Step 107, and the CPU 31 advances to Step 109. In Step 109 the CPU 31 subtracts the predetermined value ΔTA from the previous throttle aperture $TA_{OLD}$, determining a new throttle aperture TA (TA= $TAL_{OLD}-$ΔTA), and thereafter terminates this routine.

Additionally, in a case where engine speed Ne is within a range of "−α" to "+β" with respect to target idle speed Nt, a negative determination is made in both the foregoing Steps 102 and 106, and the CPU 31 holds the drive duty ratio $D_{ISC}$ of the ISC valve 17 and the throttle aperture TA at the values at that time.

Furthermore, the routine of FIG. 3 is started at a predetermined cycle (for example, an 8 ms cycle), and the CPU 31 firstly determines in Steps 201–205 whether malfunction diagnosis conditions have been fulfilled. "Malfunction diagnosis conditions" referred to herein signify existence in a state wherein a running state of the engine 1 has stabilized, i.e., a state wherein warmup has ended and friction has stabilized, and moreover wherein load has also stabilized.

In specific terms, Step 201 determines whether engine water temperature is not less than a predetermined temperature (according to this embodiment, 80° C.) indicating complete warmup. Step 202 determines whether a shift position of an automatic transmission (AT) is in a P ("park") range or N ("neutral") range. That is to say, the automatic transmission is such that friction varies according to temperature (viscosity) of transmission fluid, and because the extent of change in friction relative to fluid temperature is particularly large in a range other than the P or N range, malfunction diagnosis is not performed in other than the P and N ranges.

Additionally, Step 203 determines whether an idle switch is on, and Step 204 determines whether vehicle speed =0 km/h, i.e., whether the vehicle is in a stopped state. Furthermore, Step 205 determines whether engine speed Ne is within a target speed region (Nt−α to Nt+β). That is to say, it determines whether speed control by the ISC valve 17 or the throttle valve 6 is being performed normally.

Accordingly, in a case wherein the several conditions of the foregoing steps 201 through 205 have all been fulfilled, malfunction diagnosis processing is executed in Steps 206–209. Namely, in a case wherein idle speed is ordinarily controlled by the ISC valve 17, the throttle valve 6 is fixed at a predetermined idle position. In contrast to this, in a case wherein engine speed Ne during idle is in a stable state ("YES" in the foregoing Step 205) and moreover, the throttle valve 6 is at a position "TAH" which is opened by a predetermined angle (for example, 2°–3° ) from the idle location, this signifies that the quantity of air passing through the ISC valve 17 is excessively small, and this excessively small portion is supplemented by the throttle valve 6. Due to this, it can be determined that the ISC valve 17 has malfunctioned on the opening side (i.e., a malfunction wherein the valve does not function on the opening side).

In a case wherein the throttle valve 6 is at a position "TAL" which is closed by a predetermined angle (for example, 2°–3°) from the idle location, this signifies that the quantity of air passing through the ISC valve 17 is excessively great, and this excessively great portion is reduced by the throttle valve 6. Due to this, it can be determined that the ISC valve 17 has malfunctioned on the closing side (i.e., a malfunction wherein the valve does not function on the closing side).

In specific terms, in Step 206 the CPU 31 determines whether the throttle aperture TA is an aperture exceeding a predetermined value TAH, and in Step 207 the CPU 31 determines whether the throttle aperture TA is an aperture less than a predetermined value TAL. Accordingly, if an affirmative determination is made in step 206, in step 208 the CPU 31 stores information regarding "ISC valve opening side malfunction" in nonvolatile memory within the ECU 30. If an affirmative determination is made in Step 207, in Step 209 the CPU 31 stores information regarding "ISC valve closing side malfunction" in nonvolatile memory within the ECU 30. Depending on need, it is also acceptable to illuminate a warning light to notify the driver of malfunction occurrence.

When a negative determination is made in both Steps 206 and 207, idle speed control by the ISC valve 17 is to be performed normally, and the CPU 31 terminates this routine without further processing.

FIG. 4A–4F and 5A–5F are graphs showing waveforms of the above-described malfunction diagnosis processing more specifically. Additionally, although not shown, the water temperature condition and the shift position determination condition are fulfilled within the period indicated in these time charts. FIGS. 4A–4F show operation in a case where the ISC valve 17 has malfunctioned on the opening side (i.e., a malfunction wherein the valve does not function on the opening side), and FIGS. 5A–5F show operation in a case where the ISC valve 17 has malfunctioned on the closing side (i.e., a malfunction wherein the valve does not function on the closing side).

In FIGS. 4A–4F, the idle switch turns on at time t1, and vehicle speed becomes 0 km/h at time t2. In the neighborhood of this time t2, engine speed Ne reaches a speed region which is lower than the target speed region (Ne<Nt−α), and thereafter, the drive duty ratio $D_{ISC}$ of the ISC valve 17 gradually rises. During the rising period (time t2 to t3) of this drive duty ratio $D_{ISC}$, engine speed Ne is maintained without change in the low speed region due to opening side malfunction of the ISC valve 17.

At time t3, the drive duty ratio $D_{ISC}$ becomes 100%, and thereafter, the throttle aperture TA gradually increases from idle position. Accordingly, at time t4 wherein the throttle aperture TA exceeds the increasing side determination value TAH, determination of "ISC valve opening side malfunction" is made. Engine speed Ne is controlled in the target speed region by the adjustment of the throttle aperture TA.

Meanwhile, in FIGS. 5A–5F, the idle switch goes on at time t11, and vehicle speed becomes 0 km/h at time t12. In the neighborhood of this time t12, engine speed Ne reaches a speed region which is higher than the target speed region (Ne>Nt+β), and thereafter, the drive duty ratio $D_{ISC}$ of the ISC valve 17 gradually declines. During the declining period (time t12 to t13) of this drive duty ratio $D_{ISC}$, engine speed Ne is maintained without change in the high speed region due to closing side malfunction of the ISC valve 17.

At time t13, the drive duty ratio $D_{ISC}$ becomes 0%, and thereafter, the throttle aperture TA gradually decreases from idle position. Accordingly, at time t14 wherein the throttle aperture TA exceeds the decreasing side determination value TAL, determination of "ISC valve closing side malfunction" is made. Engine speed Ne is controlled in the target speed region by the adjustment of the throttle aperture TA.

Effects of the embodiment described in detail above will now be described.

According to this embodiment, desired idle speed control can be constantly continued in a case where the ISC valve 17 has malfunctioned by performing air quantity control using the throttle valve 6. In such a case, malfunction diagnosis of the foregoing ISC valve 17 while a suitable control state of idle speed remains unchanged becomes possible. As a result of this, malfunction of the ISC valve 17 can appropriately be detected in a wide range of situations.

According to this embodiment, unlike the prior art, malfunction diagnosis can be performed regardless of the aperture of the accelerator, and so malfunction diagnosis becomes possible even when in a state of no operation of the accelerator (i.e., an idle state).

According to this embodiment, "opening side malfunction" or "closing side malfunction" of the ISC valve 17 was diagnosed in accordance with the throttle aperture TA during idle control. For this reason, pinpointing the location of malfunction at a time of malfunction occurrence is facilitated.

(Second Embodiment)

A second embodiment of this invention will be described hereinafter with reference to FIGS. 6 and 7. However, the structure of this embodiment is similar to that of the above-described first embodiment, and so description thereof will be omitted. Accordingly, the second embodiment will be described hereinafter primarily in terms of differences with the first mode of embodiment. Furthermore, according to this embodiment, the first air quantity adjusting valve is implemented by the throttle valve 6 and the second air quantity adjusting valve is implemented by the ISC valve 17, in contrast with the first embodiment. Additionally, in an idle speed control routine which will be described later, a portion controlling idle speed by the throttle valve 6 corresponds to the "first air quantity controlling device," and a portion controlling idle speed by the ISC valve 17 corresponds to the "second air quantity controlling device."

Figure 6:
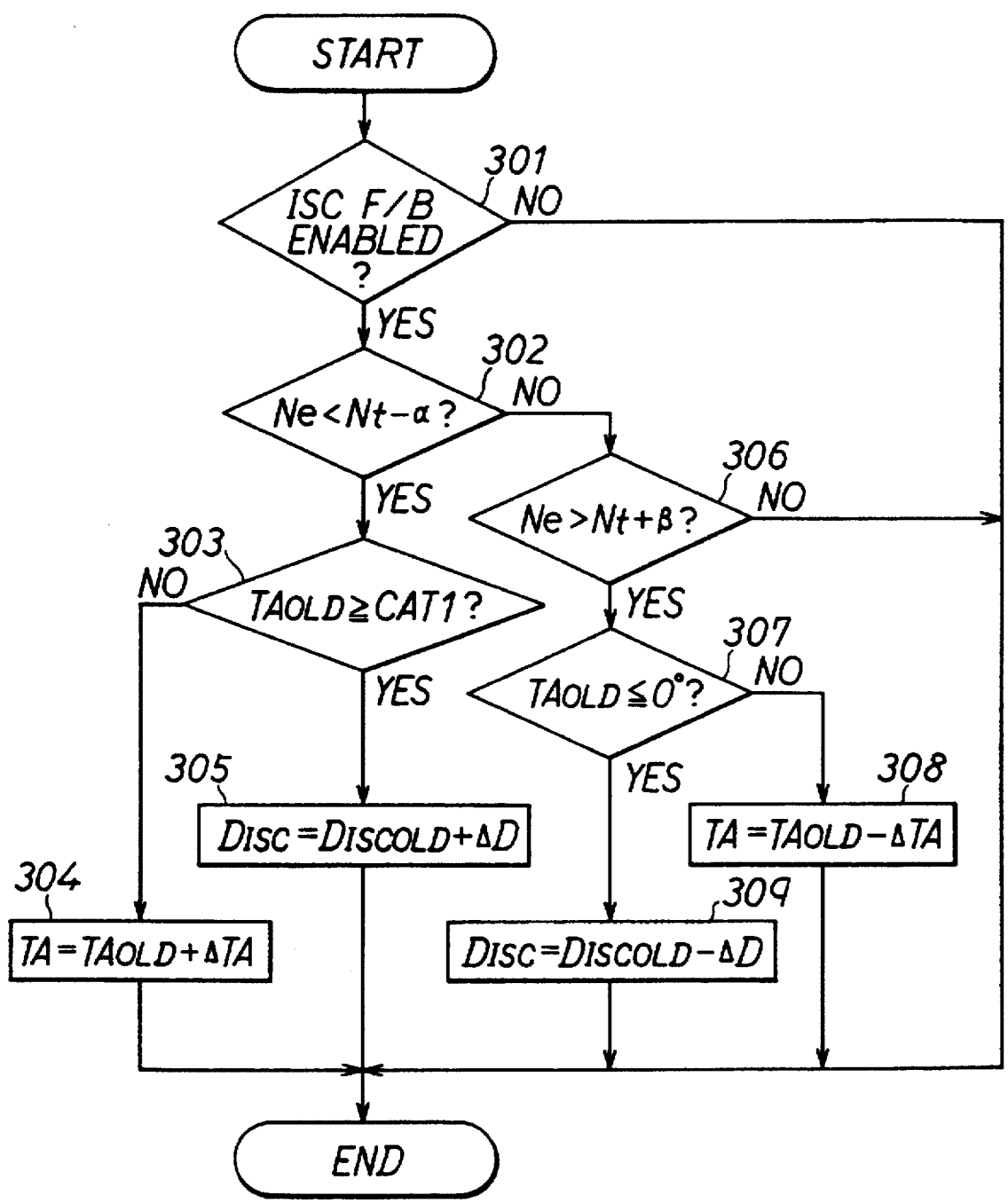
FIG. 6 is a flowchart of an idle speed control routine according to a second preferred embodiment of the present invention.
Figure 7:
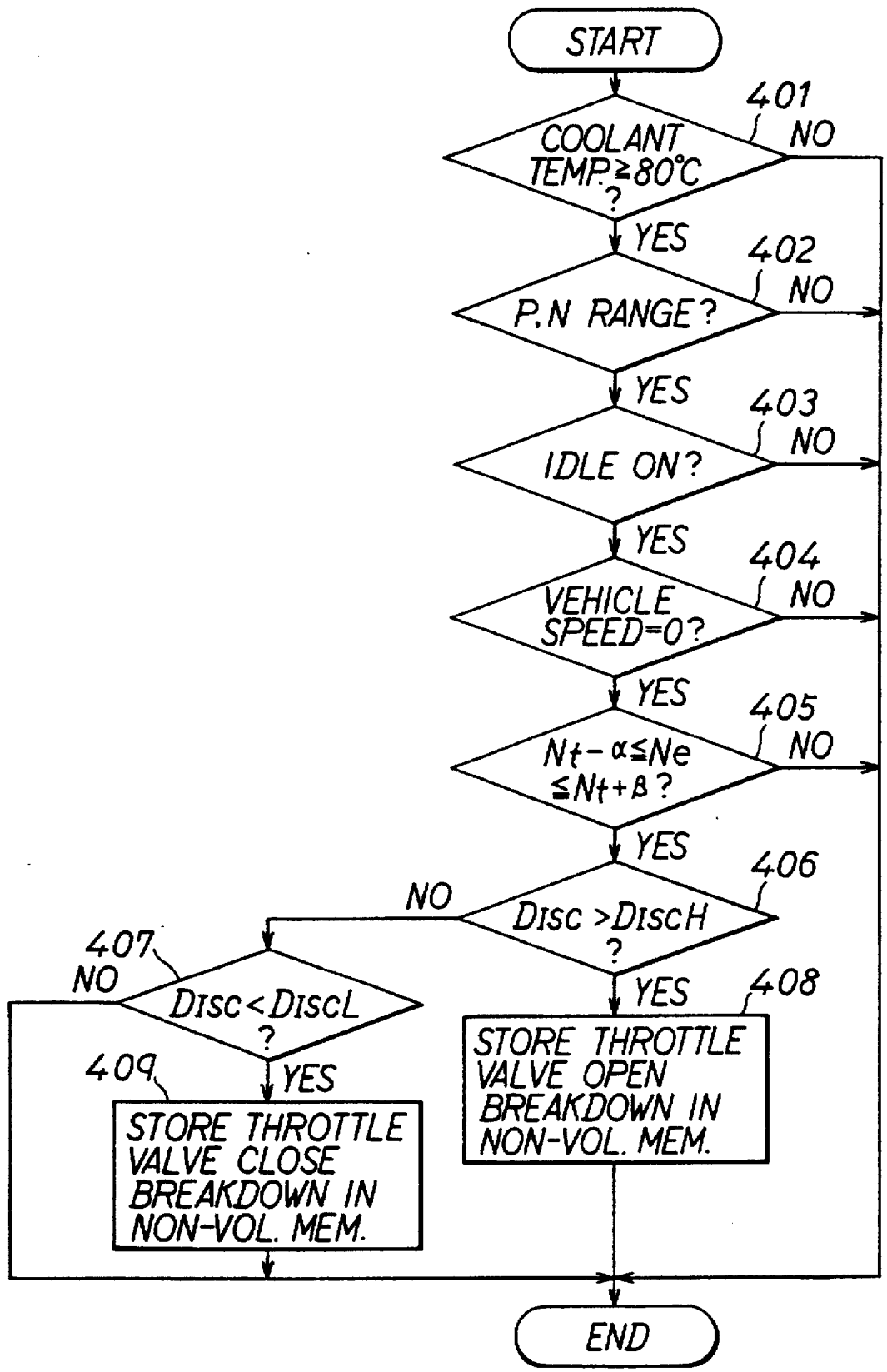
FIG. 7 is a flowchart of a malfunction diagnosis routine according to the second embodiment.

FIG. 6 shows an idle speed control routing according to this embodiment, and FIG. 7 shows a malfunction diagnosis routine for the throttle valve 6. A characteristic mode of operation according to this mode of embodiment will be described below with reference to these drawings.

The routine of FIG. 6 is actuated in a predetermined cycle (for example, an 8 ms cycle), and the CPU 31 firstly determines in Step 301 whether ISC feedback conditions have been fulfilled. In a case wherein the ISC feedback conditions are fulfilled, the CPU 31 controls engine speed Ne during idle in a target speed region (Nt–α≦Ne≦Nt+β). In such a case, initially the throttle aperture TA is controlled in a predetermined control region (according to this embodiment, 0 to 20° C.). Additionally, when the throttle aperture TA becomes 0° or less or 20° or more, the drive duty ratio $D_{ISC}$ of the ISC valve 17 is accordingly increased or decreased.

To go into greater detail, in Step 302 the CPU 31 determines whether engine speed Ne is smaller than a target speed region lower limit speed (=Nt–α). In a case where Ne<Nt α, in Step 303 the CPU 31 determines whether the previous value of throttle aperture $TA_{OLD}$ is an upper limit value Cat1 (=20°) or more. Initially, a negative determination is made in Step 303, and the CPU 31 advances to Step 304. In Step 304, the CPU 31 adds a predetermined value ΔTA (for example, 0.1 deg) to the previous throttle aperture value $TA_{OLD}$, thereby determining a new throttle aperture TA (TA=$TA_{OLD}$+ΔTA), and terminates this routine.

The throttle aperture TA continues to be added, and when the throttle aperture TA reaches Cat1, an affirmative determination is made in Step 303, and the CPU 31 advances to Step 305. In step 305 the CPU 31 adds a predetermined value ΔD (for example, 0.2%) to the previous drive duty ratio $D_{ISCOLD}$ Of the ISC valve 17, determining a new drive duty ratio $D_{ISC}$ ($D_{ISC}$=$D_{ISCOLD}$+ΔD), and terminates this routine.

Meanwhile, in a case wherein a negative determination is made in the foregoing Step 302, (i.e., in a case wherein Ne≧Nt–α), in step 306 the CPU 31 determines whether engine speed Ne is larger than a target speed region upper limit speed (=Nt+β). In a case where Ne>Nt+β, in Step 307 the CPU 31 determines whether the previous value of throttle aperture $TA_{OLD}$ is 0° or less. Initially, a negative determination is made in Step 307, and the CPU 31 advances to Step 308. In Step 308, the CPU 31 subtracts the predetermined value Δ>TA from the previous throttle aperture value $TA_{OLD}$, thereby determining a new throttle aperture TA (TA=$TA_{OLD}$ - ΔTA), and terminates this routine.

The throttle aperture TA continues to be subtracted and when the throttle aperture TA becomes 0°, an affirmative determination is made in Step 307, and the CPU 31 advances to Step 309. In Step 309, the CPU 31 subtracts the predetermined value ΔD from the previous drive duty ratio $D_{ISCOLD}$ of the ISC valve 17, determining a new drive duty ratio $D_{ISC}$ ($D_{ISC}$=$D_{ISCOLD}$ΔD), and terminates this routine.

Furthermore, the routine of FIG. 7 is started at a predetermined cycle (for example, an 8 ms cycle), and the CPU 31 firstly determines in Steps 401–405 whether malfunction diagnosis conditions have been fulfilled (this condition determination processing is equivalent to Steps 201–205 of the above-described FIG. 2).

Accordingly, in a case wherein the several conditions of the foregoing Steps 401–405 have all been fulfilled, the CPU 31 executes malfunction diagnosis processing in Steps 406–409. Namely, in a case wherein idle speed is ordinarily controlled by the throttle valve 6, the ISC valve 17 is fixed at a predetermined neutral position (i.e., its duty ratio =50%). In contrast to this, in a case wherein drive duty ratio $D_{ISC}$ of the ISC valve 17 has become a predetermined value "$D_{ISC}$ H," this signifies that the quantity of air passing through the throttle valve 6 is excessively small, and this excessively small portion is supplemented by the ISC valve 17. Additionally, in a case wherein drive duty ratio $D_{ISC}$ of the ISC valve 17 has become a predetermined value "$D_{ISC}$ L," this signifies that the quantity of air passing through the ISC valve 17 is excessively great, and this excessively great portion is reduced by the ISC valve 17. Consequently, an opening side malfunction of the throttle valve 6 (i.e., a malfunction wherein the valve does not function on the opening side) or a closing side malfunction of the throttle valve 6 (i.e., a malfunction wherein the valve does not function on the closing side) can be determined by the foregoing drive duty ratio $D_{ISC}$.

In specific terms, in Step 406 the CPU 31 determines whether $D_{ISC} > D_{ISC}$ H, and in Step 407 the CPU 31 determines whether $D_{ISC} < D_{ISC}$ L. Accordingly, if an affirmative determination is made in Step 406, in Step 408 the CPU 31 stores information regarding "throttle valve opening side malfunction" in nonvolatile memory within the ECU 30. If an affirmative determination is made in Step 407, in Step 409 the CPU 31 stores information regarding "throttle valve closing side malfunction" in nonvolatile memory within the ECU 30.

When a negative determination is made in both Steps 406 and 407, idle speed control by the throttle valve 6 is to be performed normally, and the CPU 31 terminates this routine without further processing.

According to the second embodiment, although the first air quantity adjusting valve (i.e., the throttle valve 6) and the second air quantity adjusting valve (i.e., the ISC valve 17) are the opposite of the first embodiment, a mode of operation and effect similar to the first embodiment are obtained. As a result of this, malfunction of the ISC valve 17 for performing idle control can appropriately be detected in any type of case.

Furthermore, it is possible for this invention to be embodied in the following modes in addition to the embodiments described above.

For example, in the above embodiments, during idle the throttle valve 6 or the ISC valve 17 was driven and idle speed was controlled to a desired speed region in that way. That is, the present invention was embodied in an idle speed controller. Other than this, however, it is also acceptable to embody this invention in an engine controller for use during periods other than idle time. For example, a structure to drive the throttle valve 6 or the ISC valve 17 to obtain a target engine speed in accordance with an accelerator aperture is also acceptable.

Further, according to the above embodiments, the first and second air quantity adjusting valves were implemented by the throttle valve 6 and the ISC valve 17, but this may be varied. For example, in a case where a plurality of electronic control throttle valves have been provided in an engine air intake system, or in a case wherein a plurality of ISC valves have been provided, a structure to diagnose malfunction of the respective valves is acceptable.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A malfunction diagnosis device for an engine speed controller provided with first and second air quantity adjusting valves in an engine intake system wherein quantity of intake air to an engine is controlled in accordance with opening and closing operation of said air quantity adjusting valves, said device comprising:

first air quantity controlling means for driving said first air quantity adjusting valve in a predetermined control region so that a target engine speed is obtained;

second air quantity controlling means for driving said second air quantity adjusting valve in continuation of said first air quantity adjusting valve in a case wherein a control quantity of said first air quantity adjusting valve due to said first controlling means has deviated from said control region; and malfunction diagnosing means for determining a control quantity of said second air quantity adjusting valve due to said second controlling means and, when said control quantity is not in a predetermined region, inferring that a malfunction has occurred on said first air quantity adjusting valve side.

2. The device of claim 1, wherein:

said malfunction diagnosing means is for diagnosing a malfunction when said first air quantity adjusting valve does not function on an opening side at a time when an aperture of said second air quantity adjusting valve controlled by said second controlling means is a predetermined value or more, and along with this, is for diagnosing a malfunction when said first air quantity adjusting valve does not function on a closing side at a time when an aperture of said second air quantity adjusting valve controlled by said second controlling means is a predetermined value or less.

3. The device of claim 2, wherein one of said first and second air quantity adjusting valves is a throttle valve, and the other of said first and second air quantity adjusting valves is an idle speed control valve for opening and closing a bypass passage of an air intake passage of said engine.

4. The device of claim 1, wherein one of said first and second air quantity adjusting valves is a throttle valve, and the other of said first and second air quantity adjusting valves is an idle speed control valve for opening and closing a bypass passage of an air intake passage of said engine.

5. A malfunction diagnosis device for an engine speed controller, said device comprising:

first air control quantity calculating means for determining a first control quantity corresponding to an amount of air to be regulated by a first air quantity adjusting valve;

first air quantity regulating means for controlling said first air quantity adjusting valve responsive to said first control quantity;

second air control quantity calculating means for determining a second control quantity corresponding to an amount of air to be regulated by a second air quantity adjusting valve;

second air quantity regulating means for controlling said second air quantity adjusting valve responsive to said second control quantity;

range determining means for determining whether at least one of said air control quantities is within a corresponding range; and malfunction determining means for, when said range determining means determines that an air control quantity corresponding to a first one of said air quantity adjusting valves is outside of its corresponding range, determining the existence of a malfunction in the other of said air quantity adjusting valves.

6. The device of claim 5, wherein one of said air quantity adjusting valves is an idle speed control valve, and the other of said air quantity adjusting valves is a throttle valve.

7. The device of claim 6, wherein said malfunction determining means is for, when said range determining means determines that an air control quantity corresponding to said idle speed control valve is outside of its corresponding range, determining the existence of a malfunction in said throttle valve.

8. The device of claim 6, wherein said malfunction determining means is for, when said range determining means determines that an air control quantity corresponding to said throttle control valve is outside of its corresponding range, determining the existence of a malfunction in said idle speed control valve.

9. The device of claim 5, wherein at least one of said first and second air quantity regulating means is for, responsive to a determination of the existence of a malfunction in the other of said first and second air quantity regulating means, controlling its corresponding air quantity adjusting valve in accordance with its corresponding air control quantity.

10. The device of claim 5, further comprising:
an engine temperature sensor; and
malfunction detection inhibiting means for inhibiting determination of said malfunction by said malfunction determining means when said engine temperature sensor indicates a temperature of said engine is below a predetermined level.

11. The device of claim 5, further comprising:
a transmission position sensor; and
malfunction detection inhibiting means for inhibiting determination of said malfunction by said malfunction determining means when said transmission position sensor indicates a shift position of a transmission of said engine is other than "Park" or "Neutral".

12. The device of claim 5, further comprising malfunction detection inhibiting means for inhibiting determination of said malfunction by said malfunction determining means when said engine is not in an idle state.

13. The device of claim 5, further comprising:
an engine speed sensor; and
malfunction detection inhibiting means for inhibiting determination of said malfunction by said malfunction determining means when said engine speed sensor indicates a speed of said engine is outside a predetermined range.

14. The device of claim 5, further comprising:
a vehicle speed sensor; and
malfunction detection inhibiting means for inhibiting determination of said malfunction by said malfunction determining means when said vehicle speed sensor indicates a speed of a vehicle in which said engine is disposed is substantially non-zero.

15. A method of detecting a malfunction in an engine speed control system, said method comprising the steps of:
determining a first control quantity corresponding to an amount of air to be regulated by a first air quantity adjusting valve;
determining a second control quantity corresponding to an amount of air to be regulated by a second air quantity adjusting valve;
determining whether at least one of said air control quantities is within a corresponding range; and
determining the existence of a malfunction in a first one of said air quantity adjusting valves when an air control quantity corresponding to the other one of said air quantity adjusting valves is outside of its corresponding range.

16. The method of claim 15, wherein one of said air quantity adjusting valves is an idle speed control valve, and the other of said air quantity adjusting valves is a throttle valve.

17. The method of claim 15, wherein said malfunction existence determining step includes a step of, when an air control quantity corresponding to said idle speed control valve is outside of its corresponding range, determining the existence of a malfunction in said throttle valve.

18. The method of claim 15, wherein said malfunction existence determining step includes a step of, when an air control quantity corresponding to said throttle control valve is outside of its corresponding range, determining the existence of a malfunction in said idle speed control valve.

19. The method of claim 15, further comprising a step of, controlling one of said air quantity adjusting valves in accordance with its corresponding air control quantity responsive to a determination of the existence of a malfunction in the other of said first and second air quantity regulating valves.

* * * * *